(12) United States Patent
Shimomura et al.

(10) Patent No.: US 10,919,449 B2
(45) Date of Patent: Feb. 16, 2021

(54) DRIVING SUPPORT DEVICE AND STORAGE MEDIUM

(71) Applicant: DENSO CORPORATION, Kariya (JP)

(72) Inventors: Osamu Shimomura, Nisshin (JP); Naoki Kamikawa, Nisshin (JP); Norio Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 128 days.

(21) Appl. No.: 16/301,608

(22) PCT Filed: Feb. 28, 2017

(86) PCT No.: PCT/JP2017/007806
§ 371 (c)(1),
(2) Date: Nov. 14, 2018

(87) PCT Pub. No.: WO2017/199529
PCT Pub. Date: Nov. 23, 2017

(65) Prior Publication Data
US 2019/0283671 A1    Sep. 19, 2019

(30) Foreign Application Priority Data
May 19, 2016 (JP) .................................. 2016-100465

(51) Int. Cl.
*B60Q 9/00* (2006.01)
*G08G 1/16* (2006.01)
(Continued)

(52) U.S. Cl.
CPC .............. *B60Q 9/008* (2013.01); *B60R 21/00* (2013.01); *B60W 30/09* (2013.01); *G08G 1/16* (2013.01);
(Continued)

(58) Field of Classification Search
CPC ........ B60Q 9/008; B60R 21/00; B60W 30/09; B60W 2554/00; G08G 1/16; G08G 1/165
See application file for complete search history.

(56) References Cited

U.S. PATENT DOCUMENTS

| 2010/0066243 | A1 | 3/2010 | Igarashi et al. |
| 2012/0065858 | A1* | 3/2012 | Nickolaou ............. B60Q 9/008 701/70 |

(Continued)

FOREIGN PATENT DOCUMENTS

| JP | 2008-102690 A | 5/2008 |
| JP | 2008143387 A * | 6/2008 |

(Continued)

OTHER PUBLICATIONS

Translation of JP2008102690A (Year: 2008).*

(Continued)

*Primary Examiner* — Anne Marie Antonucci
*Assistant Examiner* — Sahar Motazedi
(74) *Attorney, Agent, or Firm* — Maschoff Brennan (57) ABSTRACT

A driving support device comprises a passing determination unit which determines whether an own vehicle is going to pass by a stopped vehicle stopped in an adjacent lane adjacent to a traveling lane on which the own vehicle is traveling; and a notification control unit which issues warning notification when it is determined that the own vehicle is going to pass by the stopped vehicle.

13 Claims, 8 Drawing Sheets

(51) Int. Cl.
*B60W 30/09* (2012.01)
*B60R 21/00* (2006.01)

(52) U.S. Cl.
CPC ......... *G08G 1/165* (2013.01); *B60W 2554/00* (2020.02)

(56) References Cited

U.S. PATENT DOCUMENTS

2013/0300551 A1* 11/2013 Weber ................... G08G 1/163
340/435
2015/0054920 A1* 2/2015 Fukata ............... G06K 9/00805
348/46

FOREIGN PATENT DOCUMENTS

| | | | |
|---|---|---|---|
| JP | 2009-043145 A | | 2/2009 |
| JP | 2009-076835 A | | 4/2009 |
| JP | 2014078056 A | * | 5/2014 |
| JP | 2014-160338 A | | 9/2014 |
| JP | 2014222421 A | * | 11/2014 ............. G08G 1/052 |

OTHER PUBLICATIONS

Translation of JP2008143387A (Year: 2008).*
Translation of JP2014222421A (Year: 2014).*
Translation of JP2014078056A (Year: 2014).*
Translation of JP2014160338AA (Year: 2014).*

* cited by examiner

DRIVING SUPPORT DEVICE AND STORAGE MEDIUM

CROSS REFERENCE TO RELATED APPLICATION

This application is a national stage application of PCT Application No. PCT/JP2017/007806, filed on Feb. 28, 2017, which is based on Japanese Patent Application No. 2016-100465 filed on May 19, 2016, the entire contents of which are incorporated herein by reference.

TECHNICAL FIELD

The present disclosure relates to a driving support device and a driving support program.

BACKGROUND ART

A known driving support device issues a warning when it judges that it is a situation where the driver is likely to misjudge the distance between the own vehicle and the vehicle ahead or the speed of the own vehicle. In addition, a known driving support device calculates the slope of the road on which the own vehicle is traveling, and, when it judges that the slope is equal to or more than a predetermined angle and the speed is equal to or higher than a predetermined speed, issues a warning (see, for example, PTL 1).

CITATION LIST

Patent Literature

[PTL 1] JP 2009-76835 A

SUMMARY OF THE INVENTION

Among the situations in which vehicles may travel, there is a situation where the vehicle passes by a stopped vehicle stopped in an adjacent lane. In that case, since the area behind the stopped vehicle is a blind spot for the driver of the own vehicle that is about to pass by the stopped vehicle, it is difficult to notice a pedestrian who suddenly appears from behind the stopped vehicle.

The present disclosure provides a driving support device and a driving support program capable of reducing the risk to a pedestrian who suddenly appears from behind a stopped vehicle in a situation where the own vehicle passes by the stopped vehicle stopped in an adjacent lane.

According to an aspect of the present disclosure, the passing determination unit determines whether the own vehicle is going to pass by a stopped vehicle stopped in an adjacent lane adjacent to the traveling lane of the own vehicle. The notification control unit issues warning notification when it is determined that the own vehicle is going to pass by the stopped vehicle. Since warning notification is issued in a situation where the own vehicle is going to pass by a stopped vehicle stopped in an adjacent lane, it is possible to reduce the risk to a pedestrian who suddenly appears from behind the stopped vehicle.

BRIEF DESCRIPTION OF THE DRAWINGS

The above and other objects, features, and advantages of the present disclosure will become clearer from the following detailed description with reference to the accompanying drawings. In the drawings.

DESCRIPTION OF THE EMBODIMENTS

Figure 1:
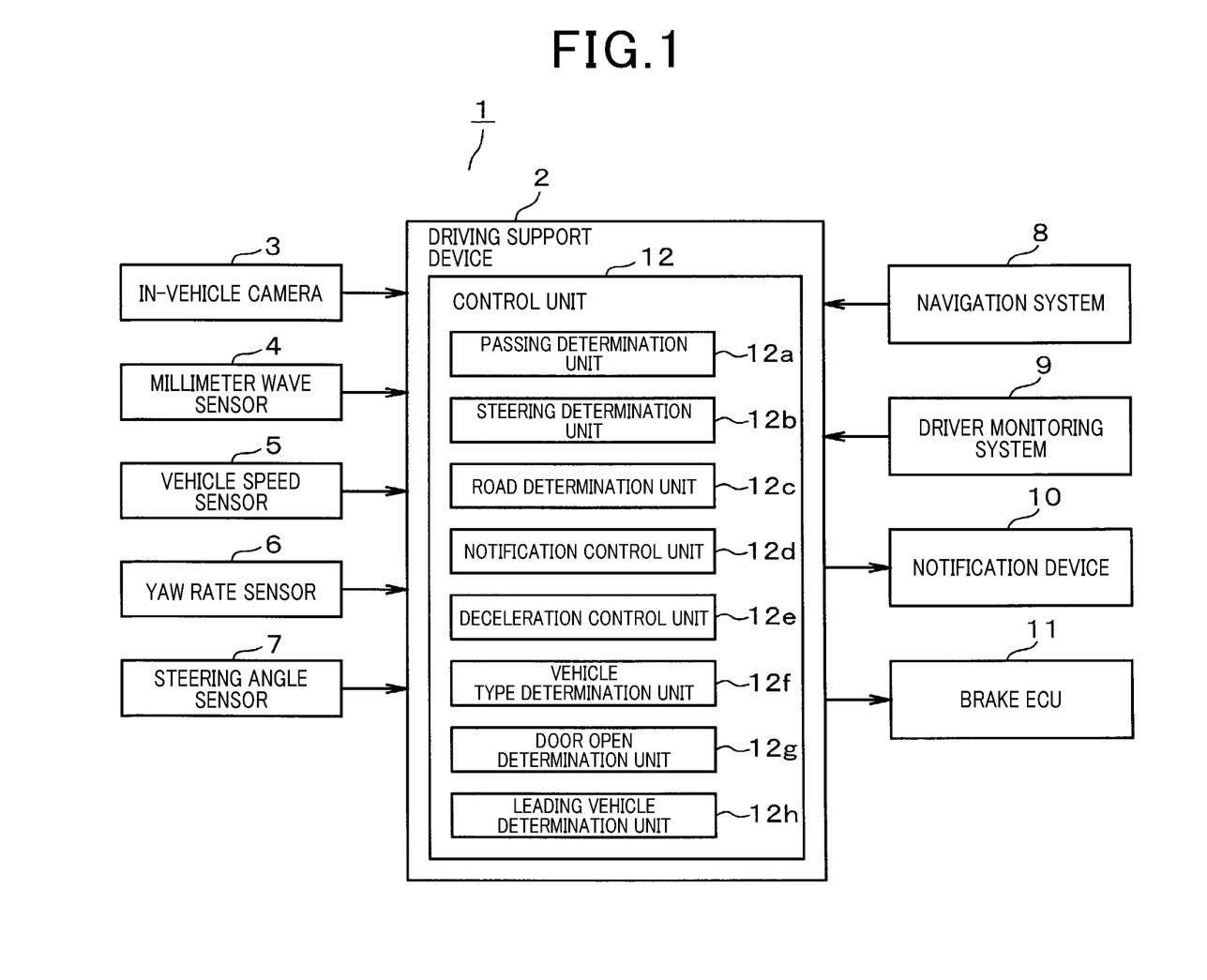
FIG. 1 is a functional block diagram showing an embodiment.

The present embodiment will be described with reference to the drawings. A driving support system 1 includes a driving support device 2, an in-vehicle camera 3 (corresponding to an image capturing unit), a millimeter wave sensor 4 (corresponding to an object detection sensor), a vehicle speed sensor 5 (corresponding to a vehicle state detection sensor), a yaw rate sensor 6 (corresponding to a vehicle state detection sensor), a steering angle sensor 7 (corresponding to a vehicle state detection sensor), a navigation system 8, a driver monitoring system 9, a notification device 10, and a brake ECU (Electronic Control Unit) 11.

The in-vehicle camera 3 is placed, for example, on the back of the rear-view mirror or at another location in the frontal part of the vehicle, and it captures images of the area in front of the vehicle and outputs a video (image) signal including the captured video (image) to the driving support device 2. The in-vehicle camera 3 is a CCD (Charge Coupled Device) image sensor, a CMOS (Complementary Metal Oxide Semiconductor) image sensor, or the like, and there may be one or more of them.

The millimeter wave sensor 4 is placed, for example, in the frontal part of the vehicle, and transmits millimeter waves (electromagnetic waves) to the front of the vehicle, detects an object ahead of the vehicle based on the reception state of the reflected wave, and outputs a detection signal including the detection result to the driving support device 2. Instead of employing the millimeter wave sensor 4, it is possible to employ a LADAR (Laser Detection and Ranging), a LIDAR (Light Detection and Ranging), or the like.

The vehicle speed sensor 5 outputs a vehicle speed signal indicating the vehicle speed of the own vehicle to the driving support device 2. The yaw rate sensor 6 outputs a yaw rate signal indicating the front-rear or left-right yaw rate of the own vehicle to the driving support device 2. The steering angle sensor 7 outputs a steering angle signal indicating the steering angle of the own vehicle to the driving support device 2.

The navigation system 8 has functions such as finding the current location of the own vehicle, and identifying the type of the road on which the own vehicle is traveling using map data (for example, ordinary road, expressway, etc.), and it outputs a navigation signal including the obtained various navigation information to the driving support device 2.

The driver monitoring system 9 has a camera for imaging the upper body of the driver seated in the driver's seat. The driver monitoring system 9 uses the image or video captured by the camera to detect the direction of the line of sight of the driver by analyzing the movement of the driver's head and eyeballs, and outputs a detection signal indicating the detection result to the driving support device 2. The camera employed in the driver monitoring system 9 is also a CCD image sensor, a CMOS image sensor, or the like, and there may be one or more of them.

The notification device 10 is a head-up display, a speaker, or the like. When a notification start command signal is input from the driving support device 2, the notification device 10 starts displaying or audio outputting the notification information, and when a notification end command signal is input from the driving support device 2, it stops the displaying or audio outputting of the notification information. The brake ECU 11 actuates the brake when it receives a brake drive signal from the driving support device 2.

The driving support device 2 includes a control unit 12. The control unit 12 is configured by a microcomputer having a CPU (Central Processing Unit), ROM (Read Only Memory), RAM (Random Access Memory), and I/O (Input/Output). The control unit 12 executes a computer program stored in a non-transitory tangible computer-readable storage medium to execute a process corresponding to the computer program, and controls the overall operation of the driving support device 2.

The control unit 12 includes a passing determination unit 12a, a steering determination unit 12b, a road determination unit 12c, a notification control unit 12d, a deceleration control unit 12e, a vehicle type determination unit 12f, a door open determination unit 12g, and a forward vehicle (vehicle-in-front) determination unit 12h. These units 12a to 12g are formed by a driving support program executed by the control unit 12, and are realized by software.

The passing determination unit 12a determines whether the own vehicle is going to pass by a stopped vehicle stopped in an adjacent lane adjacent to the traveling lane of the own vehicle. Specifically, the passing determining unit 12a determines whether there is a stopped vehicle stopped in the traveling direction of the own vehicle in the adjacent lane using the image signal input from the in-vehicle camera 3, the detection signal input from the millimeter wave sensor 4, the vehicle speed signal input from the vehicle speed sensor 5, the yaw rate signal input from the yaw rate sensor 6, the steering angle signal input from the steering angle sensor 7, the navigation signal input from the navigation system 8, and the like. For example, the passing determination unit 12a determines that there is an object in the adjacent lane based on the detection signal input from the millimeter wave sensor 4, determines the distance from the own vehicle to the object and the relative speed of the own vehicle with respect to the object, and determines that the object is a stopped vehicle by analyzing the video signal for features specific to the rear face of a vehicle such as a tail lamp or a license plate and identifying a pattern similar to the rear face of a vehicle. The passing determination unit 12a thus identifies a stopped vehicle, determines the traveling state of the own vehicle based on the vehicle speed signal, the yaw rate signal, and the steering angle signal, and judges whether the own vehicle is going to pass by the stopped vehicle stopped in the adjacent lane.

The steering determination unit 12b uses the steering angle signal input from the steering angle sensor 7 to determine whether the driver is controlling the steering wheel to, for example, change lanes or turn right or left at an intersection. The road determination unit 12c uses the navigation signal input from the navigation system 8 to determine whether the road on which the vehicle is traveling is an expressway.

The notification control unit 12d controls the outputting of the notification start command signal and the notification end command signal to the notification device 10, and controls the start and end of the notification by the notification device 10 for warning the driver or for prompting the driver to decelerate or stop the own vehicle. The deceleration control unit 12e controls the outputting of the brake drive signal to the brake ECU 11, and controls the driving of the brake by the brake ECU 11.

The vehicle type determination unit 12f uses, for example, the video signal input from the in-vehicle camera 3 to determine the type of the stopped vehicle. The vehicle type determination unit 12f identifies, for example, the stopped vehicle as an ordinary vehicle by analyzing features specific to the rear face of an ordinary vehicle and identifying a pattern similar to an ordinary vehicle, and identifies the stopped vehicle as a bus by analyzing features specific to the rear face of a bus and identifying a pattern similar to a bus.

The door open determination unit 12g uses, for example, the video signal input from the in-vehicle camera 3 and the detection signal input from the millimeter wave sensor 4 to determine whether the door of the stopped vehicle is open. The forward vehicle determination unit 12h uses, for example, the video signal input from the in-vehicle camera 3 and the detection signal input from the millimeter wave sensor 4 to determine whether a forward vehicle that is going to pass by or passing by the stopped vehicle has decelerated or stopped. The forward vehicle determination unit 12h may receive a vehicle speed signal indicating the speed of the forward vehicle via inter-vehicle communication to determine whether the forward vehicle that is going to pass by or passing by the stopped vehicle has decelerated or stopped.

Next, the operation of the above configuration will be described with reference to FIGS. 2 to 8.

Figure 2:
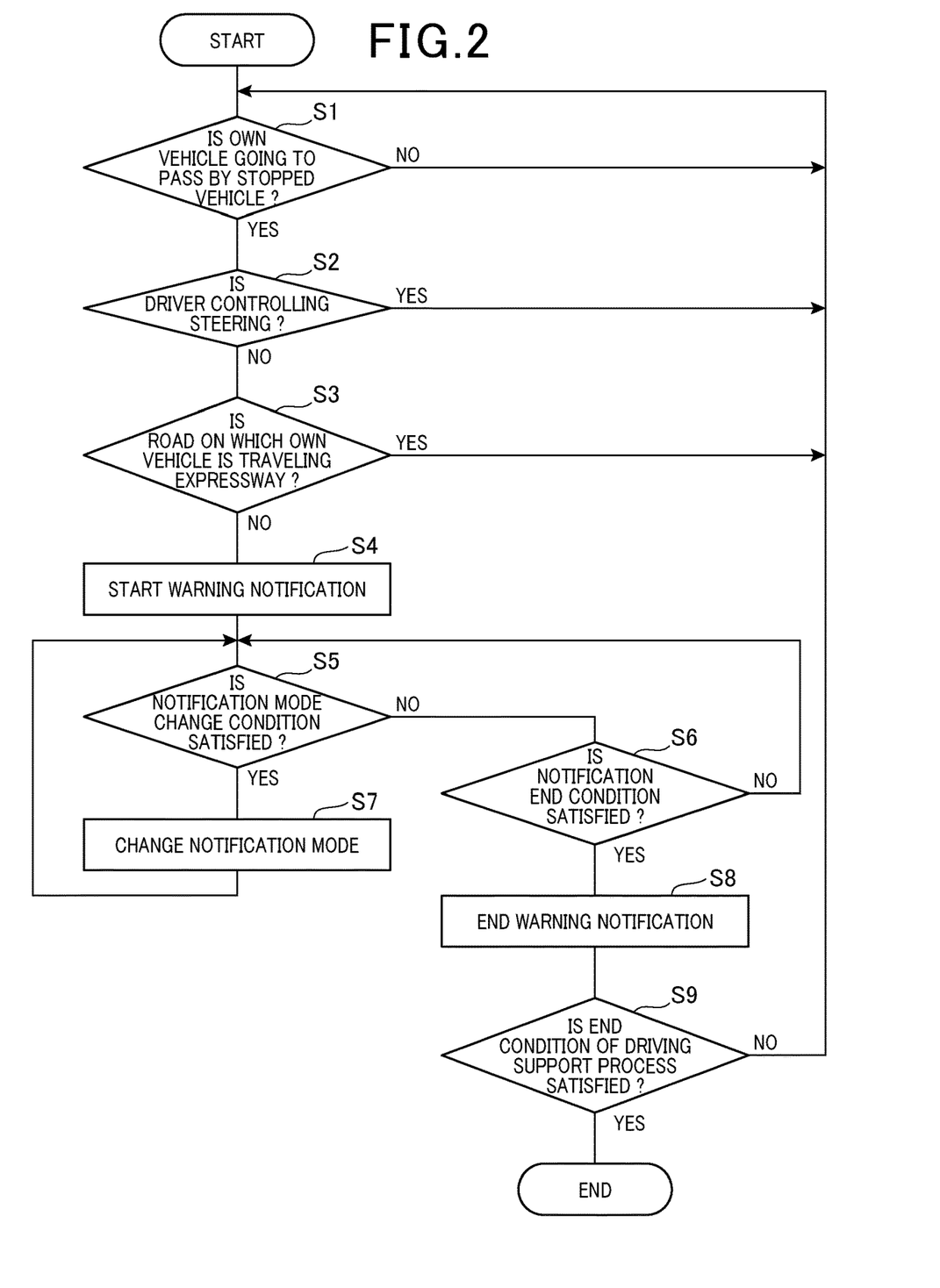
FIG. 2 is a flowchart.

The control unit 12 performs a driving support process. The control unit 12 starts the driving support process when a start condition(s) (for example, the ignition switch has been switched from off to on) for the driving support process is met. The control unit 12 may, for example, set the start condition for the driving support process as when the vehicle speed is equal to or higher than a certain speed, or when the driver has performed a predetermined operation.

After starting the driving support process, the control unit 12 determines whether the own vehicle is going to pass by a stopped vehicle stopped in an adjacent lane (S1, corresponding to passing determination procedure). When it is determined that the own vehicle is going to pass by a stopped vehicle (S1: YES), the control unit 12 determines whether the driver is controlling the steering wheel to, for example, change lanes or turn right or left at an intersection (S2). When it is determined that the driver is not controlling the steering wheel to, for example, change lanes or turn right or left at an intersection (S2: NO), the control unit 12 determines whether the road on which the own vehicle is traveling is an expressway (S3). When it is determined that the road on which the own vehicle is traveling is not an expressway (S3: NO), the control unit 12 outputs a notification start command signal to the notification device 10 to start issuing notification for warning (S4: corresponding to notification control procedure). For example, the control unit 12 displays on a head-up display a message such as "WARNING HIDDEN PEDESTRIAN (Be careful of a pedestrian who suddenly appears)" or outputs a voice message from the speaker.

Figure 3:
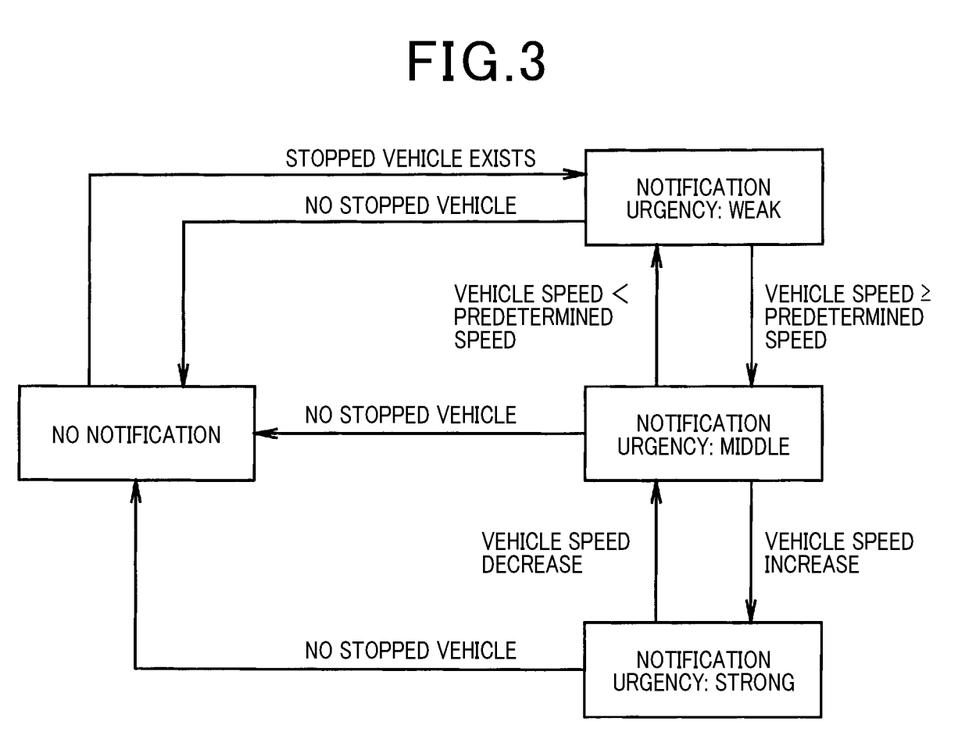
FIG. 3 is a state transition diagram of the notification mode.

Next, the control unit 12 determines whether a notification mode change condition(s) is satisfied (S5), and determines whether a notification termination condition(s) is satisfied (S6). When the control unit 12 determines that the notification mode change condition is satisfied (S6: YES), the control unit 12 changes the notification mode (S7). If, for example, the notification mode change condition is a change in the vehicle speed, as shown in FIG. 3, the control unit 12 increases the notification urgency when the vehicle speed becomes equal to or higher than a predetermined speed or along with the increase in the vehicle speed, and decreases the notification urgency when the vehicle speed becomes lower than the predetermined speed or along with its decrease. For example, if the message is to be displayed on the head-up display, the control unit 12 changes the notification urgency by changing the content or color of the message. In addition, for example, if the message is a voice message output from the speaker, the control unit 12 changes the notification urgency by changing the content, volume, or frequency of the message.

Other than a change in the vehicle speed, the notification mode change condition may be a change in the distance in the traveling direction or lateral direction from the own vehicle to the stopped vehicle, a change in the line-of-sight direction of the driver, a deceleration operation or acceleration operation performed by the driver, or the like, or some of them may be combined. If the notification mode change condition is set as a change in the distance from the own vehicle to the stopped vehicle, the control unit 12 may increase the notification urgency as the distance from the own vehicle to the stopped vehicle decreases (that is, as the vehicles approach each other). If the notification mode change condition is set as a change in the line-of-sight direction of the driver, the control unit 12 may increase the notification urgency as the line-of-sight direction of the driver deviates from the direction of the stopped vehicle. Further, if the notification mode change condition is that the driver performs decelerating operation or accelerating operation, the control unit 12 may decrease the notification urgency as the driver performs the decelerating operation, and increase the notification urgency as the driver performs the acceleration operation.

After determining whether the notification end condition is satisfied, the control unit 11 outputs a notification end command signal to the notification device 10 and terminates the warning notification (S8). When, for example, identification of a pattern similar to the rear face of a vehicle based on the video signal becomes impossible, the control unit 12 may use the vehicle speed of the vehicle and the distance from the own vehicle to the stopped vehicle at that time to calculate the timing at which the own vehicle finishes passing by the stopped vehicle, and terminate the warning notification using the calculated timing as the timing at which the notification end condition is satisfied.

The control unit 12 determines whether the end condition (s) of the driving support process is satisfied (S9). When it is determined that the end condition(s) of the driving support process is not satisfied (S9: NO), the control unit 12 returns to step S1 and repeats the steps after step S1. When it is determined that the end condition(s) of the driving support process (for example, the ignition switch has been switched from on to off) is satisfied (S9: YES), the control unit 12 ends the driving support process. The control unit 12 may, for example, set the end condition for the driving support process as when the vehicle speed is lower than a certain speed, or when the driver has performed a predetermined operation.

Figure 4:
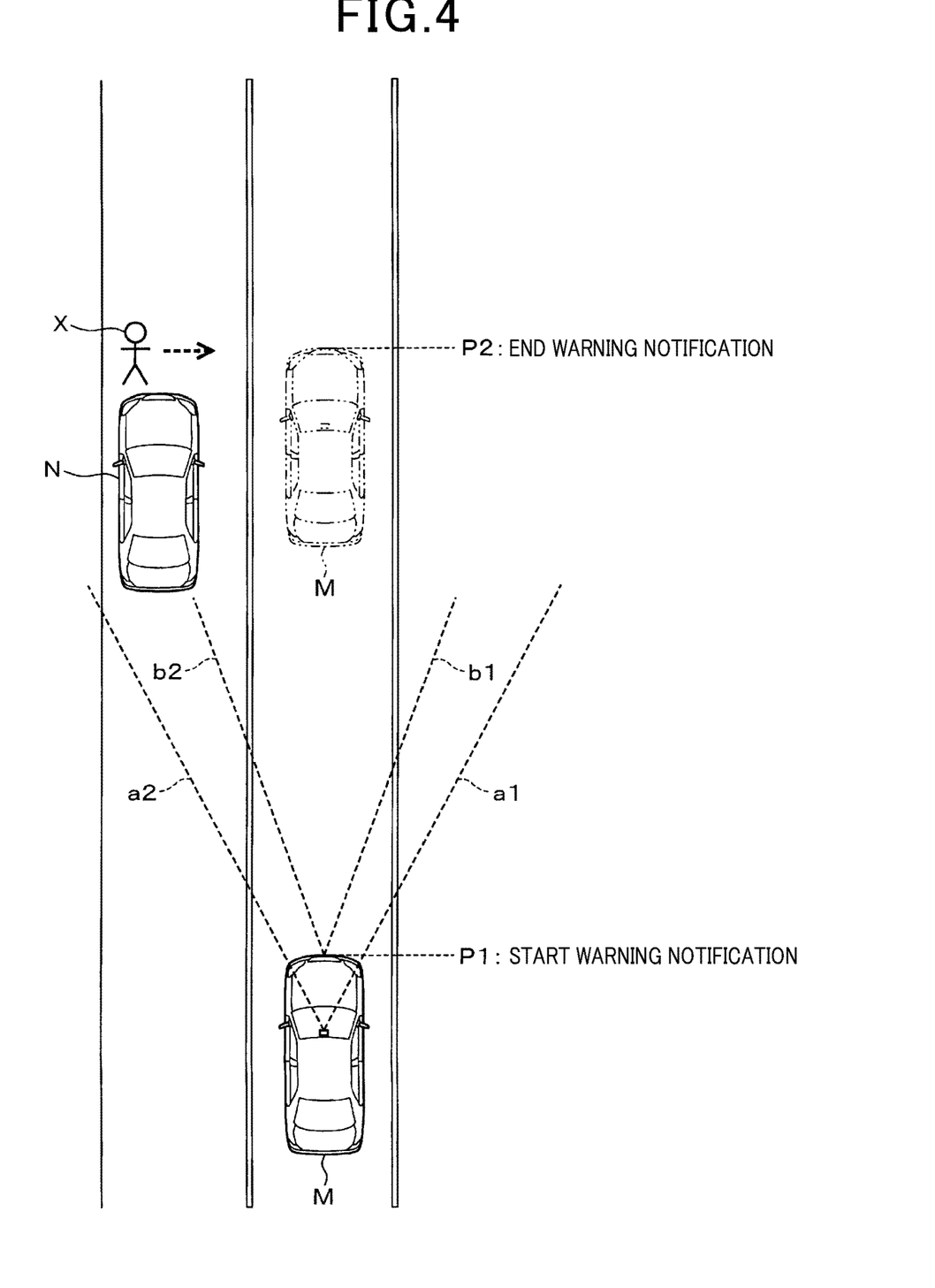
FIG. 4 is a diagram showing the relationship between the own vehicle and the stopped vehicle (part 1).

As shown in FIG. 4, by performing the above-described process, when the imaging range (that is, the angle of view) of the in-vehicle camera 3 is defined by a1 and a2, and the transmission range of the millimeter wave from the millimeter wave sensor 4 is defined by b1 and b2, the control unit 12 starts the warning notification when the own vehicle is at the position P1 and when it determines that the own vehicle M is going to pass by the stopped vehicle N. Then, the control unit 12 continues the warning notification until the own vehicle M reaches the position P2. This makes it possible to warn the driver of a pedestrian X who suddenly appears from behind the stopped vehicle N and to reduce the risk to the pedestrian X who suddenly appears from behind the stopped vehicle N. If it is determined that the notification end condition is satisfied when the own vehicle M is at the position P2, the control unit 12 terminates the warning notification.

Figure 5:
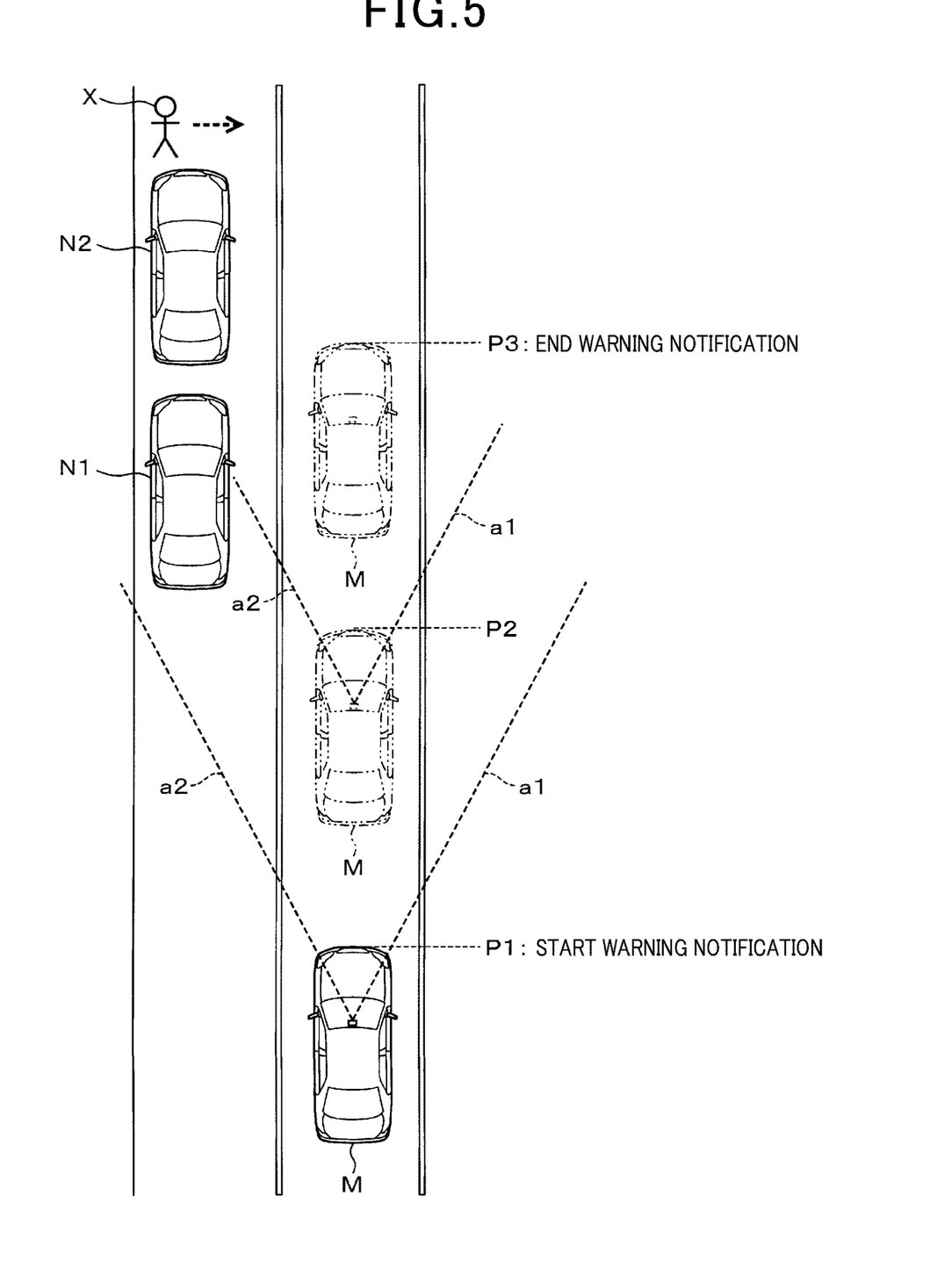
FIG. 5 is a diagram showing the relationship between the own vehicle and the stopped vehicle (part 2).

Further, since the control unit 12 judges whether there is a stopped vehicle using not only the video signal input from the in-vehicle camera 3 but also the detection signal input from the millimeter wave sensor 4, even if there are multiple stopped vehicles in a row, it is possible to reduce the risk to a pedestrian who suddenly appears from behind the foremost stopped vehicle. That is, as shown in FIG. 5, according to a configuration in which the control unit 12 determines whether there is a stopped vehicle in the adjacent lane by using only the video signal input from the in-vehicle camera 3, when the own vehicle M is at the position P1, it detects the last stopped vehicle N1 by identifying the rear face of the stopped vehicle N1. However, when the own vehicle M is at the position P2, since the rear face of the stopped vehicle N2 stopped in front of the stopped vehicle N1 is hidden behind the stopped vehicle N1, it cannot identify the rear face of the stopped vehicle N2, and it becomes difficult to detect the presence of the stopped vehicle N2. As a result, the control unit 12 determines that the notification end condition is satisfied when the own vehicle M is at the position P3 and erroneously terminates the warning notification.

Figure 6:
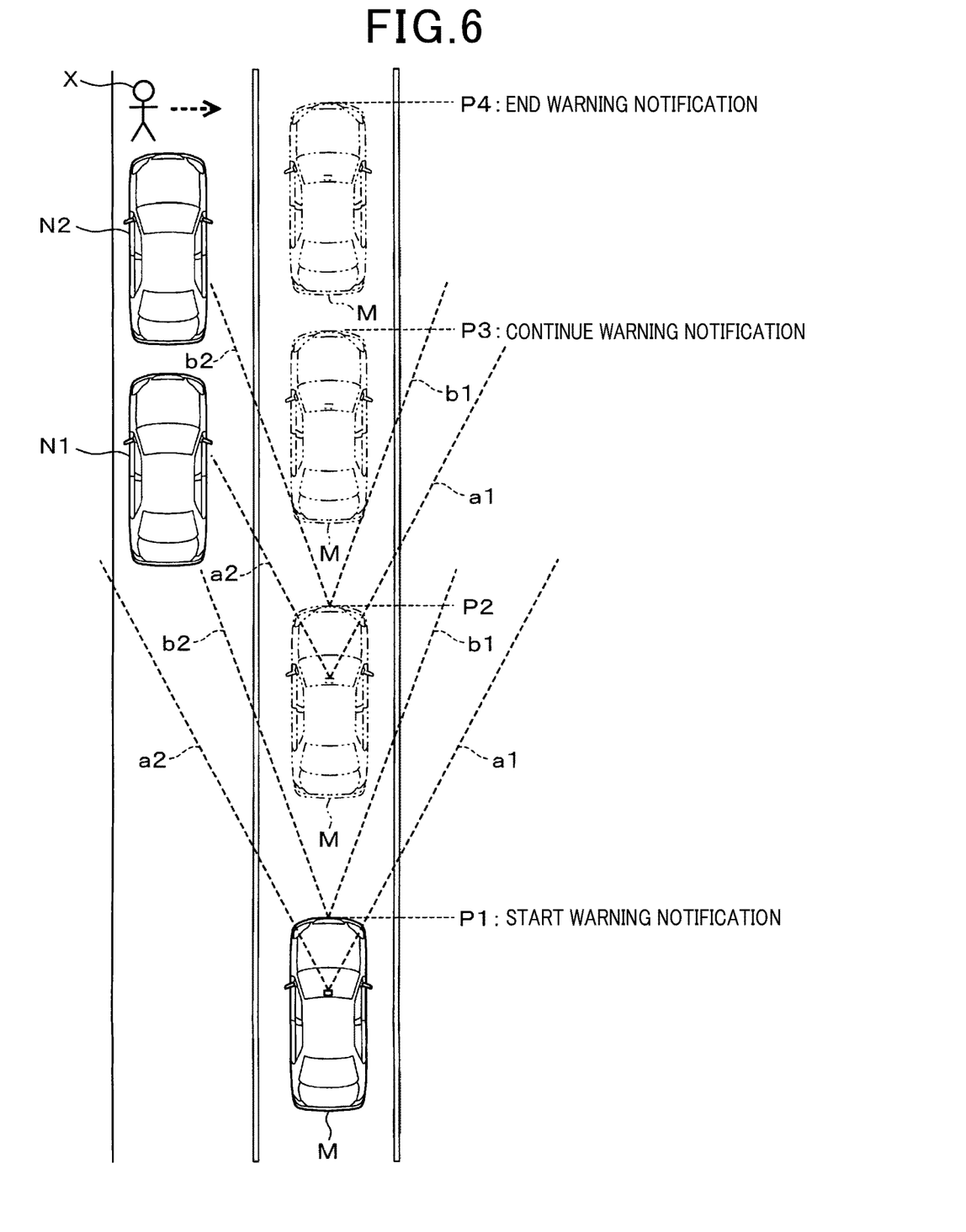
FIG. 6 is a diagram showing the relationship between the own vehicle and the stopped vehicle (part 3).

On the other hand, as shown in FIG. 6, according to a configuration in which the control unit 12 determines whether there is a stopped vehicle by using not only the video signal input from the in-vehicle camera 3 but also the detection signal input from the millimeter wave sensor 4, when the own vehicle M is at the position P1, it detects the last stopped vehicle N1 by identifying the rear face of the stopped vehicle N1. After that, when the own vehicle M is at the position P2, although the rear face of the stopped vehicle N2 is hidden behind the stopped vehicle N1 and cannot be identified, it can still detect the presence of the stopped vehicle N2 by receiving reflected waves. As a result, the control unit 12 does not determine that the notification end condition is satisfied when the own vehicle M is at the position P3 and continues the warning notification, and determines that the notification end condition is satisfied when the own vehicle M is at the position P4 and terminates the warning notification. This makes it possible to reduce the risk to the pedestrian X who suddenly appears from behind the foremost stopped vehicle even when there are multiple stopped vehicles in a row. Not to mention, it is possible to reduce the risk to the pedestrian X who suddenly appears from between adjacent stopped vehicles. Note that, although an example case is shown in FIG. 6 where there are two serially stopped vehicles N1 and N2, the same applies to cases where there are three or more serially stopped vehicles.

Figure 7:
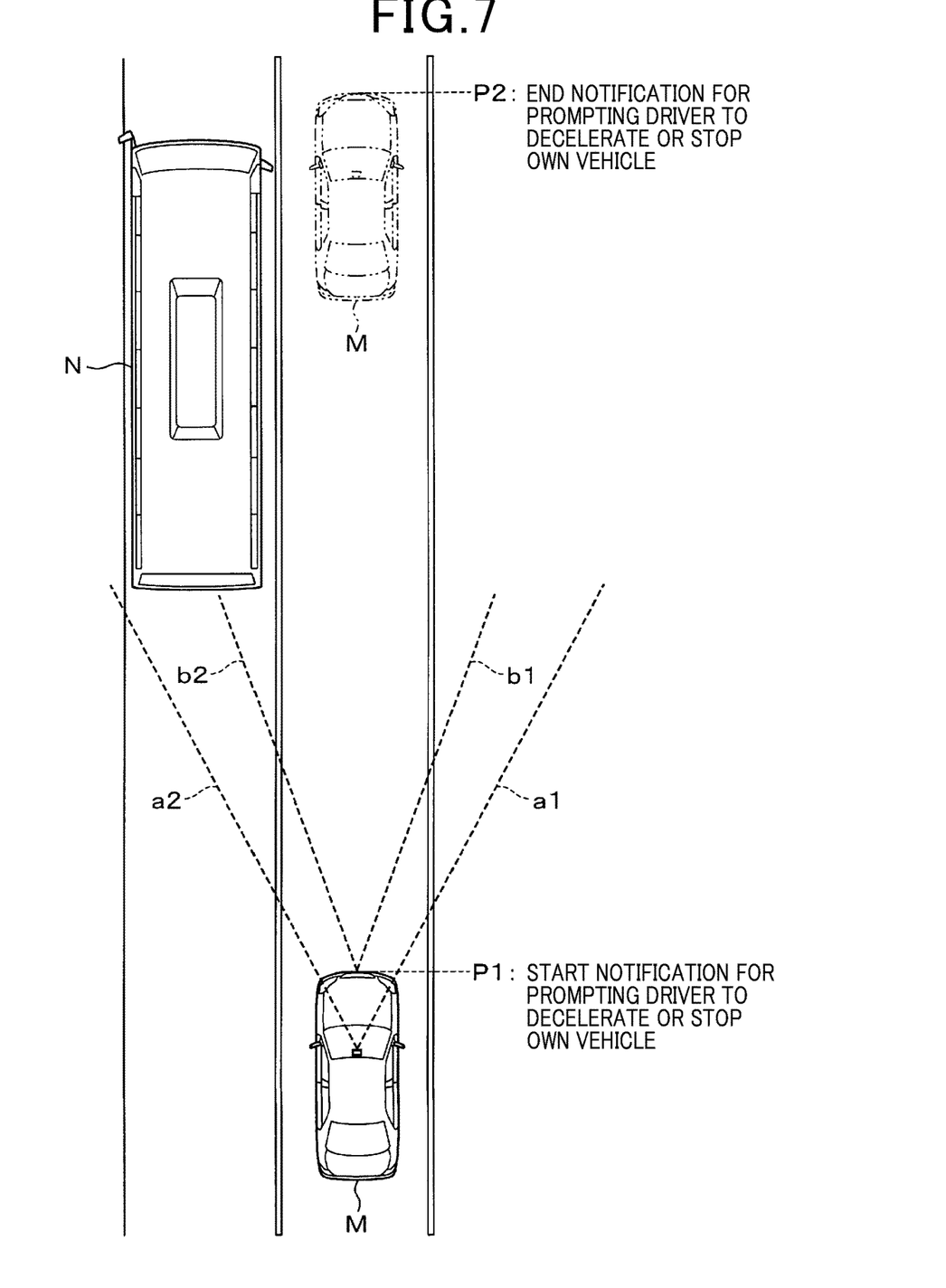
FIG. 7 is a diagram showing the relationship between the own vehicle and the stopped vehicle (part 4).

Further, as shown in FIG. 7, when the control unit 12 judges that the type of the stopped vehicle N is a bus based on the video signal input from the in-vehicle camera 3 and the detection signal input from the millimeter wave sensor 4, instead of the warning notification, it may issue a notification for prompting the driver to decelerate or stop the own vehicle. That is, when the stopped vehicle N is a bus, since there is a danger of a person who has got off from the bus, who suddenly appears from behind the bus, rather than just prompting attention, deceleration or stopping of the own vehicle may be prompted. In this case, for example, the control unit 12 displays on a head-up display a message such as "SLOW DOWN (Perform deceleration operation)" or "COLLISION RISK: STOP (Perform stopping operation)", or outputs a voice message from the speaker.

Figure 8:
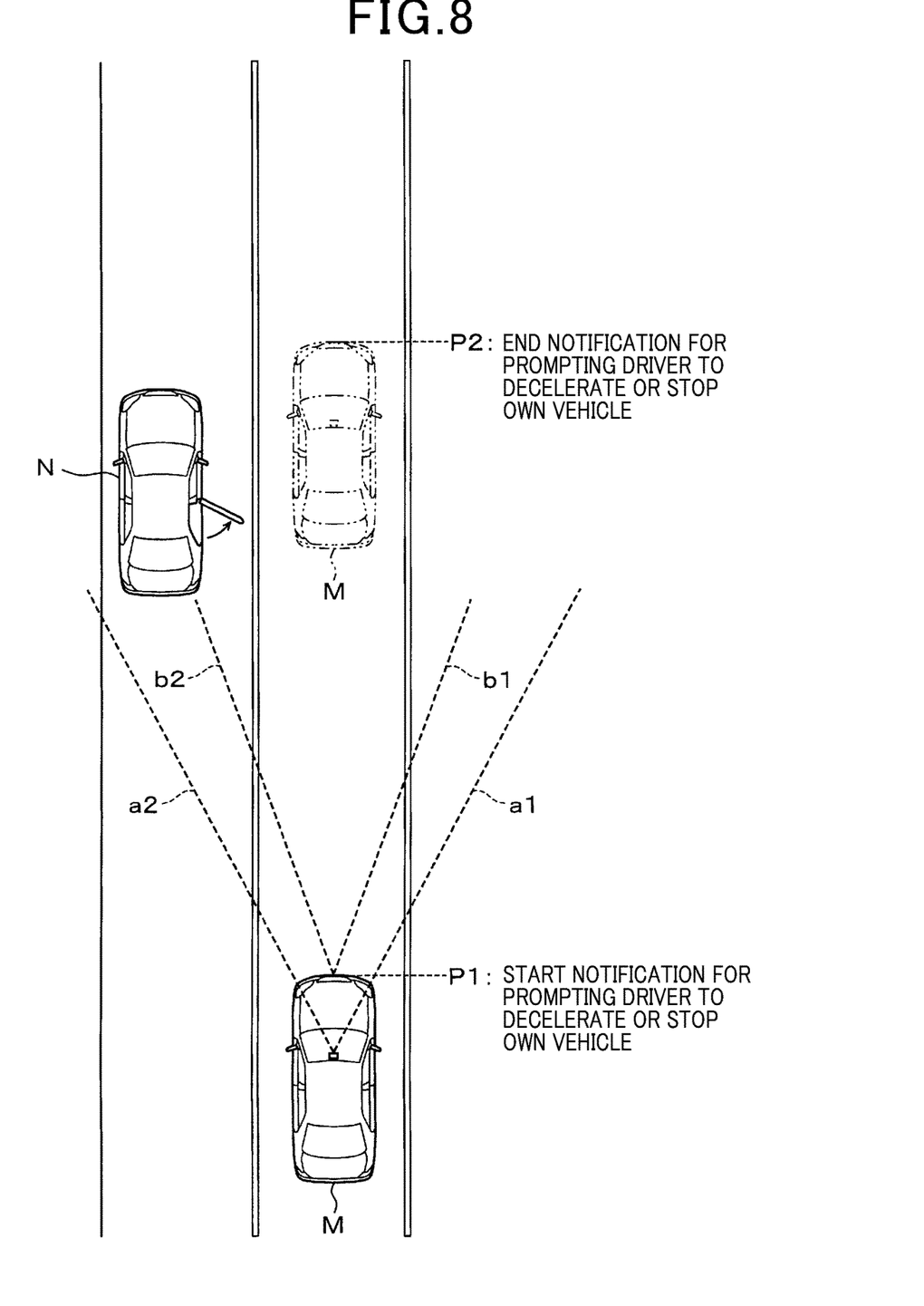
FIG. 8 is a diagram showing the relationship between the own vehicle and the stopped vehicle (part 5).

Further, as shown in FIG. 8, when the control unit 12 judges that the door of the stopped vehicle N is open based on the video signal input from the in-vehicle camera 3 and the detection signal input from the millimeter wave sensor 4, as with the above case, instead of the warning notification, it may issue a notification for prompting the driver to decelerate or stop the own vehicle. That is, when the door of the stopped vehicle N is open, since there may be a person getting out of the stopped vehicle N and the person who has got out of the stopped vehicle N may jump out from behind the stopped vehicle N, rather than just prompting attention, deceleration or stopping of the own vehicle may be prompted. Note that, although FIG. 8 illustrates an example case where the door by the right rear seat of the stopped vehicle N, that is, the door on the side of the traveling lane on which the own vehicle is traveling is open, the same applies to a case where the door by the right front seat (that is, the driver's seat if the vehicle is right-hand drive) of the stopped vehicle M is open, and also the same applies to a case where a door by a left side seat of the stopped vehicle N, that is, a door on the opposite side from the traveling lane on which the own vehicle is running is open.

Further, when there is a forward vehicle that is going to pass by or passing by a stopped vehicle, the control unit 12 judges whether the forward vehicle has decelerated or stopped, and it may also prompt deceleration operation or stop operation of the own vehicle, instead of warning notification. That is, when it is determined that the forward vehicle has decelerated or stopped, the control unit 12 determines that there is a high probability that the driver of the forward vehicle has noticed a pedestrian who suddenly appears from behind the stopped vehicle, and prompts the driver to decelerate or stop the own vehicle.

In addition, if notification is going to be issued regarding a vehicle waiting for a signal at an intersection as the target stopped vehicle, this means that notification is issued unnecessarily even in a situation where the possibility of a pedestrian who suddenly appears is low. Thus, to prevent such inconvenience, the control unit 12 may limit the target depending on whether the road on which the own vehicle is traveling is left-hand traffic or right-hand traffic. That is, if the own vehicle is traveling on a road having bidirectional traffic and left-hand traffic, the control unit 12 may issue notification for stopped vehicles stopped in the adjacent lane on the left of the traveling lane, and not issue notification for stopped vehicles stopped in the adjacent lane on the right of the traveling lane. Similarly, if the own vehicle is traveling on a road having bidirectional traffic and right-hand traffic, the control unit 12 may issue notification for stopped vehicles stopped in the adjacent lane on the right of the traveling lane, and not issue notification for stopped vehicles stopped in the adjacent lane on the left of the traveling lane.

As described above, according to the present embodiment, the following effects can be obtained.

According to the driving support device 2, when it is determined that the own vehicle is going to pass by a stopped vehicle stopped in an adjacent lane adjacent to the traveling lane of the own vehicle, warning notification is issued. This makes it possible to reduce the risk to a pedestrian who suddenly appears from behind the foremost stopped vehicle.

In addition, according to the driving support device 2, even when it is determined that the own vehicle is going to pass by a stopped vehicle, if it is determined that the driver is performing steering, warning notification is not given. This makes it possible to, for example, prevent issuing notification in situations such as when the own vehicle passes by a stopped vehicle waiting for the signal upon turning right or left at an intersection, and thus situations where notification is unnecessarily performed can be avoided.

In addition, according to the driving support device 2, even when it is determined that the own vehicle is going to pass by a stopped vehicle, if it is determined that the road on which the own vehicle is an expressway, warning notification is not given. This makes it possible to prevent issuing notification in situations such as when the own vehicle is traveling on an expressway which prohibits pedestrians from entering, and thus situations where notification is unnecessarily performed can be avoided.

The driving support device 2 determines whether there is a stopped vehicle using not only the image signal input from the in-vehicle camera 3 but also the detection signal input from the millimeter wave sensor 4, and it determines whether the own vehicle is going to pass by the stopped vehicle using the vehicle speed signal input from the vehicle speed sensor 5, the yaw rate signal input from the yaw rate sensor 6, the steering angle signal input from the steering angle sensor 7, and the like. This makes it possible to reduce the risk to a pedestrian who suddenly appears from behind the foremost stopped vehicle or from between adjacent stopped vehicles even when there are multiple stopped vehicles in a row.

Further, when it is judged that the type of the stopped vehicle is a bus, instead of the warning notification, the driving support device 2 issues a notification for prompting the driver to decelerate or stop the own vehicle. Thus, when there is a danger of a person who has got off from the bus, who suddenly appears from behind the bus, rather than just prompting attention, deceleration or stopping of the own vehicle is prompted, and therefore more appropriate notification can be issued.

Further, when it is judged that the door of the stopped vehicle is open, as with the above case, instead of the warning notification, the driving support device 2 issues a notification for prompting the driver to decelerate or stop the own vehicle. Thus, when there is a danger of a person who has got out of the stopped vehicle, who suddenly appears from behind the stopped vehicle, rather than just prompting attention, deceleration or stopping of the own vehicle is prompted, and therefore more appropriate notification can be issued.

Further, when it is judged that a forward vehicle that is going to pass by or passing by a stopped vehicle has decelerated or stopped, as with the above case, instead of the warning notification, the driving support device 2 issues a notification for prompting the driver to decelerate or stop the own vehicle. Thus, when it is likely that the driver of the forward vehicle has noticed a pedestrian who suddenly appears from behind the stopped vehicle, rather than just prompting attention, deceleration or stopping of the own vehicle is prompted, and therefore more appropriate notification can be issued.

The driving support device 2 limits the target depending on whether the road on which the own vehicle is traveling is left-hand traffic or right-hand traffic. This makes it possible to prevent issuing notification unnecessarily in situations where it is unlikely that a pedestrian will emerge.

Although the present disclosure is described based on embodiments, it should be understood that the present disclosure is not limited to the embodiments and structures. The present disclosure encompasses various modifications and variations within the scope of equivalence. In addition, the scope of the present disclosure and the spirit include other combinations and embodiments, only one component thereof, and other combinations and embodiments that are more than that or less than that.

Upon issuing the warning notification, automatic deceleration control may also be performed by driving the brake. In this case, for example, when the vehicle speed is lower than a predetermined speed, only the notification for warning may be given, and when the vehicle speed is equal to or higher than the predetermined speed, the notification for warning and the automatic deceleration control may be performed together. Similarly, for example, when the distance between the own vehicle and the stopped vehicle is smaller than a predetermined distance, only the notification for warning may be given, and when the distance between the own vehicle and the stopped vehicle is equal to or more than the predetermined distance, the notification for warning and the automatic deceleration control may be performed together. Further, it is also possible to perform automatic deceleration control by driving the brake upon issuing the notification for prompting the driver to decelerate or stop the own vehicle.

The invention claimed is:

1. A driving support device comprising:
a passing determination unit which determines whether an own vehicle is going to pass by a stopped vehicle that is stopped in an adjacent lane that is adjacent to a traveling lane on which the own vehicle is traveling; and
a notification control unit which issues a warning notification when it is determined that the own vehicle is going to pass by the stopped vehicle, wherein
the passing determination unit determines not only whether the own vehicle is going to pass by the stopped vehicle but also whether the own vehicle is passing by the stopped vehicle,
the notification control unit starts issuing the warning notification in response to determining that the own vehicle is going to pass by the stopped vehicle,
the notification control unit continues issuing the warning notification in response to determining that the own vehicle is passing by the stopped vehicle, and
the notification control unit calculates, while continuing to issue the warning notification, a timing at which the own vehicle finishes passing by the stopped vehicle using a vehicle speed of the own vehicle and a distance from the own vehicle to the stopped vehicle, and terminates the warning notification depending on the timing that is calculated.

2. The driving support device according to claim 1, further comprising a steering determination unit for determining whether a driver is currently controlling a steering wheel, wherein
when it is determined that the own vehicle is going to pass by the stopped vehicle and the driver is not controlling the steering wheel, the notification control unit issues the warning notification, and when it is determined that the own vehicle is going to pass by the stopped vehicle and the driver is controlling the steering wheel, the notification control unit does not issue the warning notification.

3. The driving support device according to claim 1, further comprising a road determination unit which determines whether a road on which the own vehicle is traveling is an expressway, wherein,
when it is determined that the own vehicle is going to pass by the stopped vehicle and the road on which the own vehicle is traveling is not an expressway, the notification control unit issues the warning notification, and when it is determined that the own vehicle is going to pass by the stopped vehicle and the road on which the own vehicle is traveling is an expressway, the notification control unit does not issue the warning notification.

4. The driving support device according to claim 1, wherein
the passing determination unit uses an image captured by an image capturing unit which captures the image of an area in a traveling direction of the own vehicle, a detection result of an object detection sensor which detects an object in the traveling direction of the own vehicle by electromagnetic waves, and a detection result of an own vehicle state detection sensor which detects a state of the own vehicle to determine whether the own vehicle is going to pass by the stopped vehicle.

5. The driving support device according to claim 4, wherein,
even when it is determined that there is no stopped vehicle based on the image captured by the image capturing unit, the passing determination unit uses the detection result of the object detection sensor and the detection result of the own vehicle state detection sensor to determine whether the own vehicle is going to pass by the stopped vehicle.

6. The driving support device according to claim 1, wherein,
the notification control unit changes a notification mode using at least one of the vehicle speed of the own vehicle, the distance from the own vehicle to the stopped vehicle, a line-of-sight direction of a driver, and a state of a driver's driving operation.

7. The driving support device according to claim 1, further comprising a deceleration control unit which performs automatic deceleration control of the own vehicle when it is determined that the own vehicle is going to pass by the stopped vehicle.

8. The driving support device according to claim 1, further comprising a vehicle type determination unit which determines a type of the stopped vehicle, wherein,
when it is determined that the type of the stopped vehicle is a particular type, the notification control unit issues notification for prompting a driver to decelerate or stop the own vehicle.

9. The driving support device according to claim 1, further comprising a door open determination unit which determines whether a door of the stopped vehicle is open, wherein,
when it is determined that the door of the stopped vehicle is open, the notification control unit issues notification for prompting a driver to decelerate or stop the own vehicle.

10. The driving support device according to claim 1, further comprising a forward vehicle determination unit which determines whether a forward vehicle that is going to pass by or passing by the stopped vehicle has decelerated or stopped, wherein, when it is determined that the forward vehicle has decelerated or stopped, the notification control unit issues notification for prompting a driver to decelerate or stop the own vehicle.

11. The driving support device according to claim 1, wherein, when the own vehicle is traveling on a road having bidirectional traffic and left-hand traffic, the passing determination unit determines whether the own vehicle is going to pass by a stopped vehicle that is stopped in the adjacent lane on a left of the traveling lane, and when the own vehicle is traveling on a road having bidirectional traffic and right-hand traffic, the passing determination unit determines whether the own vehicle is going to pass by a stopped vehicle that is stopped in the adjacent lane on a aright of the traveling lane.

12. The driving support device according to claim 1, wherein in a situation of at least two vehicles stopping in a row, including a first stopped vehicle and a second stopped vehicle in the adjacent lane, and the second stopped vehicle not being detected by an image capturing unit that captures an image of an area in a traveling direction of the own vehicle, the second stopped vehicle is detected using an object detection sensor after determining the own vehicle is passing by the first stopped vehicle, wherein the object detection sensor detects objects in the traveling direction of the own vehicle using electromagnetic waves, and wherein the notification control unit continues issuing the warning notification in response to a detection result of the object detection sensor.

13. A non-transitory computer-readable storage medium containing thereon a program configured to cause a control unit of a driving support device to execute a program comprising instructions, the instructions comprising:

determining whether an own vehicle is going to pass by a stopped vehicle that is stopped in an adjacent lane that is adjacent to a traveling lane on which the own vehicle is traveling;

issuing a warning notification when it is determined that the own vehicle is going to pass by the stopped vehicle, a start of the warning notification being issued in response to determining that the own vehicle is going to pass by the stopped vehicle;

determining whether the own vehicle is passing by the stopped vehicle;

continuing to issue the warning notification in response to determining that the own vehicle is passing by the stopped vehicle; and calculating, while continuing to issue the warning notification, a timing at which the own vehicle finishes passing by the stopped vehicle using a vehicle speed of the own vehicle and a distance from the own vehicle to the stopped vehicle, and terminates the warning notification depending on the timing that is calculated.

* * * * *